Figure 1:
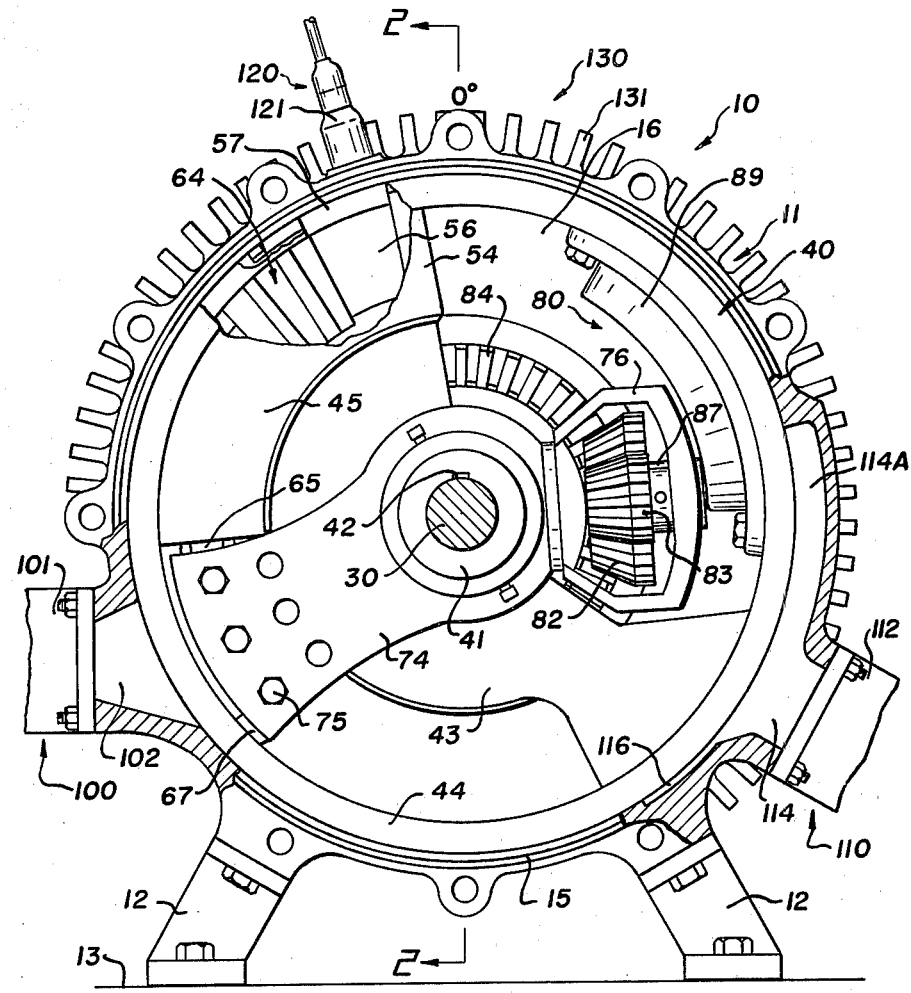

United States Patent [19]
Pike

[11] 3,885,532
[45] May 27, 1975

[54] ROTARY ENGINE

[76] Inventor: Albert Pike, 825 Condor Ave., Victoria, British Columbia, Canada

[22] Filed: Nov. 8, 1973

[21] Appl. No.: 413,900

[52] U.S. Cl. .................. 123/43 B; 123/8.47; 418/36
[51] Int. Cl. ........................................... F02b 53/00
[58] Field of Search ............... 123/43 R, 43 B, 8.47; 418/34, 36; 91/196, 197; 417/461, 462

[56] References Cited
UNITED STATES PATENTS

| | | | |
|---|---|---|---|
| 1,860,707 | 5/1932 | Ezbelent | 123/43 B |
| 3,801,237 | 4/1974 | Gotthold | 418/36 |

FOREIGN PATENTS OR APPLICATIONS

| | | | |
|---|---|---|---|
| 160,125 | 3/1921 | United Kingdom | 418/36 |
| 589,791 | 6/1947 | United Kingdom | 123/43 B |

*Primary Examiner*—C. J. Husar
*Assistant Examiner*—Michael Koczo, Jr.
*Attorney, Agent, or Firm*—Fetherstonhaugh & Co.

[57] ABSTRACT

An internal combustion engine have a rotor secured to a drive shaft and provided with a curved cylinder near the outer periphery thereof. A beam is rockingly mounted on a hub of the rotor and one end of the beam is connected by a rod to a piston fitted to the cylinder while the opposite end of the beam is connected by a gear train to a rim of the rotor. The arrangement allows the rotor to rotate continuously in one direction carrying with it the piston which is reciprocated in the cylinder by the action of the gear train. During each complete revolution of the rotor there is an intake, compression, power and exhaust stroke of the piston with the power stroke serving to drive the rotor a short distance ahead of the piston and thereby impart a driving impulse to the drive shaft.

7 Claims, 12 Drawing Figures

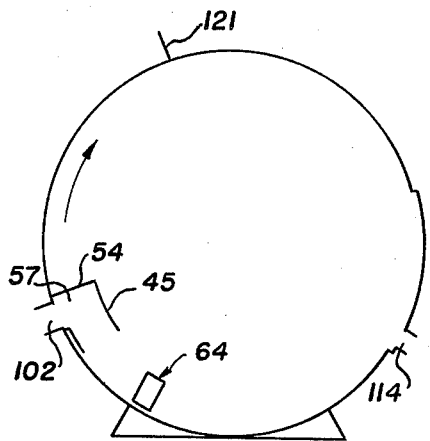
Fig. 9. INTAKE
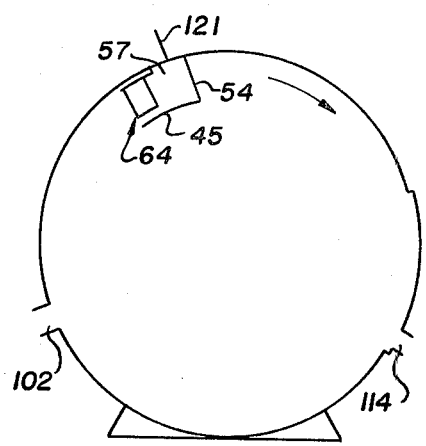
Fig. 10. COMPRESSION
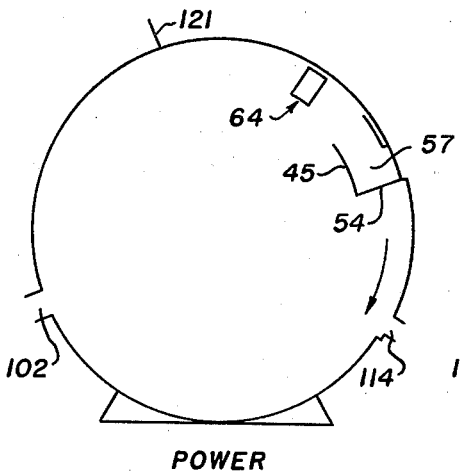
Fig. 11. POWER
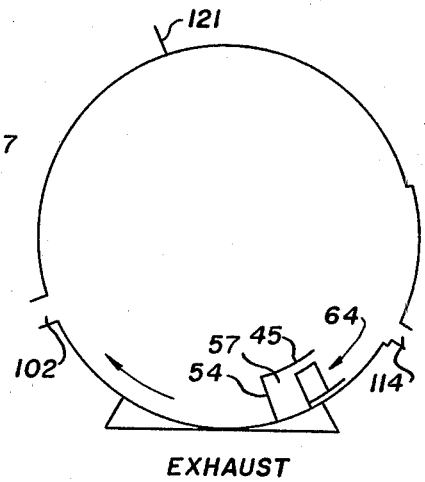
Fig. 12. EXHAUST

ROTARY ENGINE

My invention relates to an improved internal combustion rotary engine.

Known rotary engines have a number of disadvantages which may explain why they are not more widely used and these include the amount of pollution they cause for the horsepower developed as compared with some conventional piston-type engines. Many of these rotary engines are quite complex and are therefor costly to manufacture and difficult to maintain. Others do not provide sufficient power for the fuel they consume and this low efficiency is unacceptable particularly during an era of fuel shortages.

I overcome many of the disadvantages inherent in known engines by providing a rotary engine of a simplified design which is efficient and economical to operate. Each stroke of the piston is relatively long for the size of the unit and this minimizes the exhausting of unburned gases.

Figure 2:
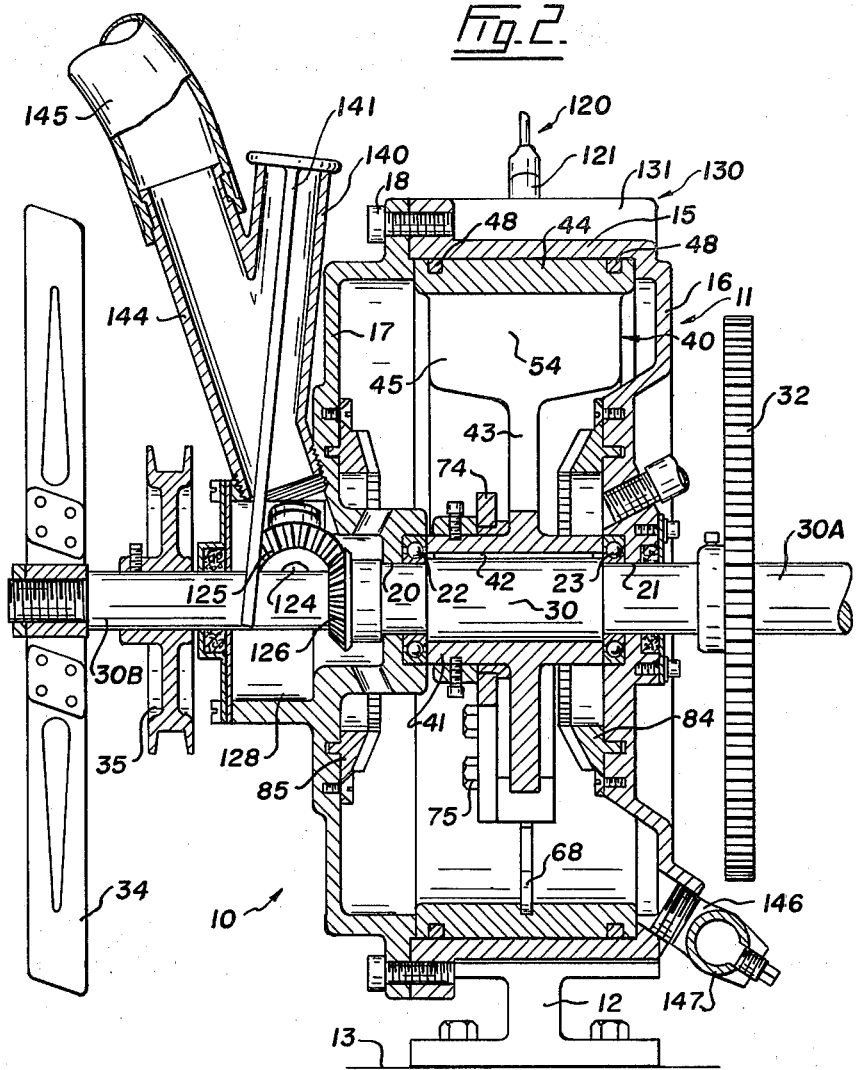
Figure 3:
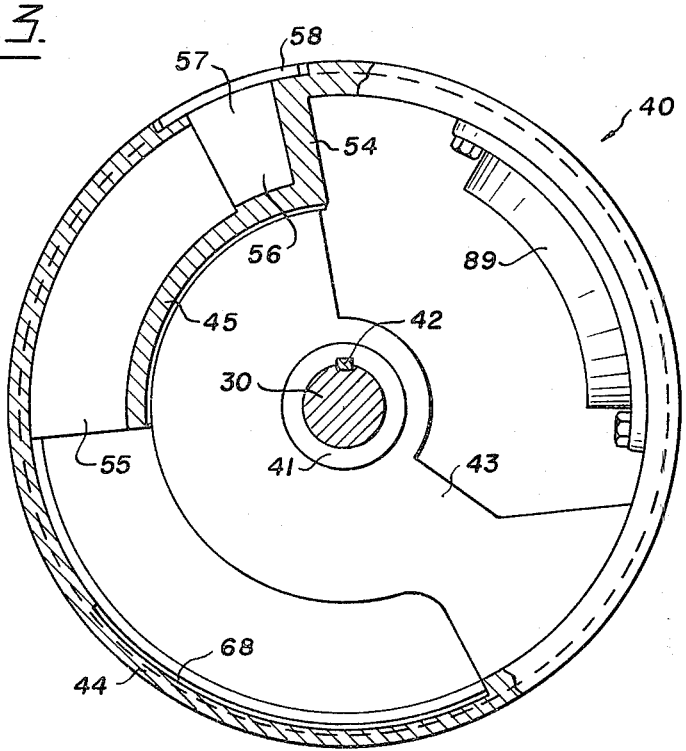
Figure 4:
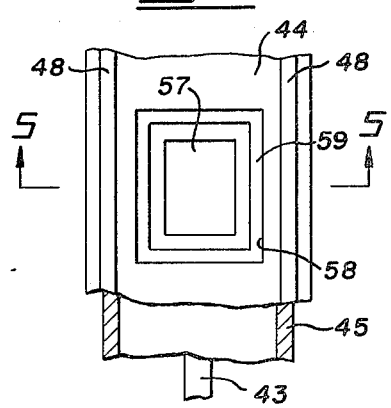
Figure 5:
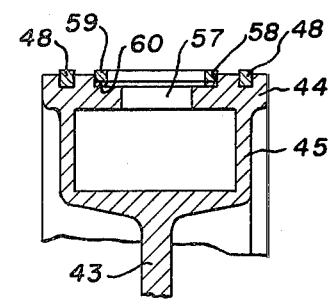
Figure 6:
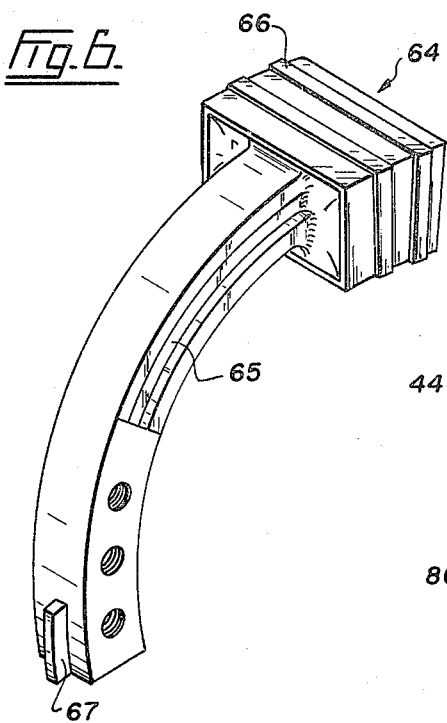
Figure 8:
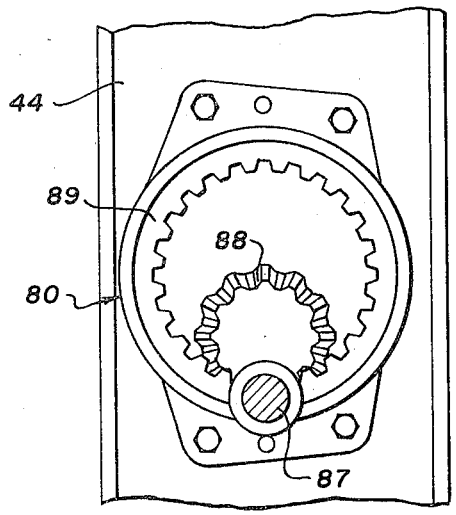
Figure 7:
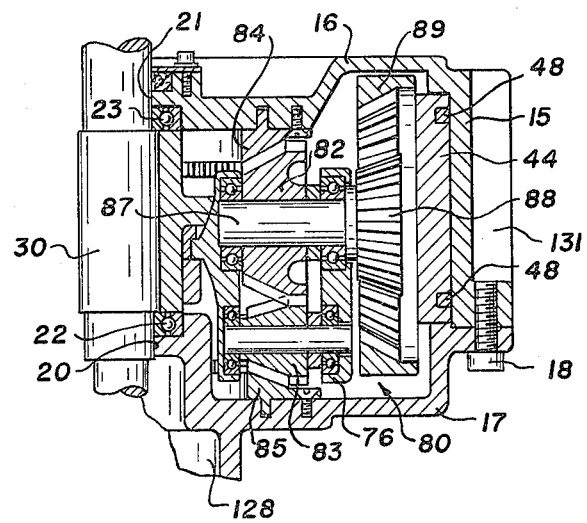

In the drawings which illustrate a preferred embodiment of the invention,

FIG. 1 is a side elevation of the present rotary engine with one end wall thereof removed and other parts broken away and shown in section, FIG. 2 is a vertical section taken on the line 2—2 of FIG. 1, FIG. 3 is a side elevation of a rotor of the engine with parts broken away and shown in section, FIG. 4 is a fragmentary plan of a rim of the rotor and showing an underlying cylinder part in section, FIG. 5 is a transverse section taken on the line 5—5 of FIG. 4, FIG. 6 is a perspective view of a piston and connecting rod therefor which is fitted to the cylinder, FIG. 7 is a horizontal section showing gear means of the engine, FIG. 8 is a front elevation of an oscillator gear forming part of the gear means, and FIGS. 9 to 12 are diagrammatic views showing the operating cycle of the engine.

Referring to the drawings, and particularly to FIGS. 1 and 2, the numeral 10 indicates generally a rotary engine constructed in accordance with the present invention. The engine 10 comprises a housing 11 which is mounted on legs 12 so as to be supported above a suitable base 13 in a vertical standing position. The housing 11 has an annular side wall 15 and end walls 16 and 17. Side wall 15 is quite narrow (i.e. 4 inches or so in width) and preferably the end wall 16 is integrally formed therewith. The end wall 17 is bolted as at 18 to the annular side wall 15 of the housing opposite the fixed side wall 16. Horizontally aligned openings 20 and 21 are formed in the fixed and removable end walls of the housing and these openings are fitted with bearings 22 and 23 respectively, see particularly FIG. 2.

Journalled in the bearings 22 and 23 is a horizontally disposed drive shaft 30 which extends through the aligned openings in the housing 11 so that an outwardly projecting splined end 30A of said shaft can be operatively connected to the machine or the like which is to be driven by the engine. This splined end of the shaft 30 is fitted with a wheel gear 32 adapted to be engaged by the pinion of a starter motor, neither of which are shown. The opposite exposed end 30B of the drive shaft 30 is fitted with the usual cooling fan 34 and pulley 35 forming part of a conventional belt drive to other engine components, not shown.

Engine 10 is fitted with a rotor generally indicated at 40, see FIGS. 1, 2 and 3. As shown best in FIG. 3, the rotor 40 has a hub 41 which is nonrotatably secured to the drive shaft 30 by means of a key 42. A web 43 is formed on the hub 41 with one end of said web being connected to a band-like rim 44. The opposite end of the web 43 is connected to a cylinder 45 which extends alongside the inner surface of the rim 44. The circular rim 44 is approximately the same width as the annular side wall 15 of the housing, the rim being adapted to rotate within the confines of the housing and out of contact with the three walls thereof. The outer surface of the rim 44 is grooved to receive transversely spaced oil rings 48 (i.e. FIGS. 4 and 5) which are in sliding contact with the inner surface of the housing wall 15.

The cylinder 45 is curved so that its longitudinal axis is concentric to the rim 44 and, of course, to the corresponding axis of the shaft 30. Cylinder 45 is rectangular in cross-section, see FIG. 5, and it has a head 54 and an open end 55 as shown best in FIG. 3. Near the head 54, the cylinder has a combustion chamber 56 (FIG. 3) and the portion of the rim 44 which forms one wall of said cylnder is provided with an intake port 57 for said chamber, see FIGS. 3, 4 and 5. The outer periphery of the rim 44 has a rectangular groove 58 surrounding the intake port 57 and set into this groove is a correspondingly-shaped seal 59 which is urged outwardly into sliding contact with the inner surface of the housing wall 15 by means of wave springs 60.

Fitted to the cylinder 45 is a piston 64 having a curved connecting rod 65, see particularly FIG. 6. The oblong piston 64 is provided with split seals 66 which are spring-pressed into sliding contact with the cylinder walls. Piston rod 65 projects from the open end 55 of the cylinder and is fitted with a guide 67 which rides in a groove 68 (FIG. 3) formed in the inner surface of the rim 44. Thus, the curved piston-rod assembly is suitably reinforced and guided for reciprocatory movement within the correspondingly curved cylinder.

Referring now to FIGS. 1 and 7, the numeral 74 indicates a rocking beam which is mounted on the hub 41 so as to be able to rock relative to the rotor 40. One end of the beam 74 is secured by bolts 75 to the projecting end of the connecting rod 65 and the opposite end of said beam is formed into a cage 76.

The engine 10 is provided with gear means generally indicated at 80 for operatively connecting the rocking beam 74 to the rotor 40. As shown best in FIGS. 1, 7 and 8, the means 80 comprises intermeshing pinions 82 and 83 which are rotatably mounted in the cage 76. The large pinion 82 meshes with a bevel gear 84 secured to the inner face of the end wall 16 of the housing and the small pinion 83 engages another bevel gear 85 carried by the removable end wall 17. Secured to the large pinion 82, see FIG. 7, is a radially extending stub shaft 87 on which a bevel or cam gear 88 is fitted. The cam gear 88 engages an oscillator gear 89 which is bolted to the inner surface of the rotor rim 44. FIGS. 1 and 8 show best the construction of the oscillator gear 89 and it will be seen to be an internal ring gear which is bevelled to mesh with the cam gear 88.

It will be noted that the cam gear 88 is eccentric with respect to the large pinion 82 on the center of the stub shaft 87 and that the ratio between the oscillator gear and cam gear is 2 to 1. Rotor 40 rotates clockwise as shown in FIG. 1 and, of course, carries with it the piston 64 and rod 65 as well as the rocking beam 74 on which the pinions 82 and 83 are mounted. The stationary bevel gears 84 and 85 cause the pinions 82 and 83 to rotate in response to rotation of the rotor anad consequently the cam gear 88 is rotated within the oscillator gear 89. FIG. 8 shows the cam gear at the bottom of the oscillator gear at which time the piston is nearest to the cylinder head 54 or in a position which might be considered the equivalent of top dead centre (TDC) of a conventional internal combustion engine. When the rotor is moved through 180°, the cam gear 88 is caused to rotate 360° and this results in the piston 64 moving away from the cylinder head 54 to a position which may be considered as the equivalent of bottom dead centre (BDC). Rotation of the rotor through another 180° rolls the cam gear 88 about its own axis through a further 360° and this moves the piston 64 from bottom dead centre to top dead centre. Thus, there are two strokes of the piston for each complete revolution of the rotor.

The engine 10 has means generally indicated at 100 for supplying fuel to the cylinder 45 and preferably this means includes an intake manifold 101 which is secured to the housing as shown in FIG. 1. This manifold 101 connects with a supply port 102 formed in the side wall 15 of the housing. Port 102 starts at a point spaced 232° clockwise from the top center of the housing (0°) and extends to a point spaced 256° from the 0° index.

Engine 10 has means for exhausting the products of combustion from the cylinder 45, the means being generally indicated at 110 in FIG. 1. The means 110 comprises an exhaust manifold 112 which is bolted to the housing wall 15 to communicate with an exhaust port 114 formed in said housing wall and having a radial axis spaced 119° from the 0° index. Port 114 has an extension 114A formed in the inner surface of the housing wall 15 and which extends upwardly away from the manifold 112 to a point 76° from the 0° index. A compression release groove 116, see FIG. 1 only, is formed on the inner surface of the wall 15 to connect with the exhaust port 114. Groove 116 begins at 125° and ends at 150° relative to the 0° index.

The engine 10 has an ignition system generally indicated at 120 and including a spark plug 121 (FIGS. 1 and 2) which is located at a point spaced 343° clockwise from the 0° index. Timing of the spark produced by the plug 121 is effected by a distributor (not shown) which has a shaft 124 (FIG. 2) suitably journalled in the end wall 17 to extend outwardly therefrom, this shaft being connected by bevelled gears 125 and 126 to the drive shaft 30, see FIG. 2 also. These bevelled gears are enclosed with a compartment 128 formed in the removable end wall 17 of the housing.

Engine 10 has a combined lubricating and cooling system generally indicated at 130 and including vanes 131 which are provided on the outer periphery of the housing. Oil is entered into the compartment 128 through a vertical standing filler pipe 140 mounted on the housing wall 17, this filler pipe being fitted with a combined dip stick and cap 141. Pipe 140 has a branch 144 which is connected by a flexible hose 145 to an oil cooling radiator, not shown. The housing has an oil return pipe 146 which is connected by a flexible hose 147 to the same radiator. When the engine is running, the lubricating oil is thrown by centrifugal force outwardly away from the drive shaft and on to all of the moving parts of the engine. Heated oil from the housing is circulated through the radiator before being returned to the engine in a heat-extracting and lubricating cycle.

To understand the operation of the engine 10, reference should be made to FIGS. 9 to 12. In FIG. 9, the piston 64 and cylinder head 54 are shown widely spaced apart at which time a vacuum exists in the combustion chamber 56 by virtue of the earlier movement of the piston away from the cylinder head. Thus, a mixture of fuel and air is drawn into the combustion chamber 56 from the manifold 101 and through the supply port 102 and the intake port 57. The fuel-mixture is compressed when the rotor 40 moves clockwise to position the piston 64 close to the cylinder head 54, or with only the combustion chamber 56 therebetween as shown in FIG. 10. Ignition now takes place and the rotor 40 is driven ahead of the piston as shown in FIG. 11 whereby to impart a driving impulse to the drive shaft 30. The products of combustion are exhausted from the chamber 56 when the widely separated piston 64 and head 54 sweep past the exhaust port 114 as shown in FIG. 11. It will be noted the groove 116 will serve to relieve compression which would otherwise tend to build up in the combustion chamber 56 at this point and subsequently interfere with the volume of fuel-air later drawn into the combustion chamber. FIG. 12 shows the location of the piston 64 relative to the cylinder head 54 when the engine is ready to take in another charge of fuel-air mixture which occurs, as previously described, during the FIG. 9 movement of the piston.

Thus, the moving parts of the engine 10 rotate with the rotor 40 and move in a continuous clockwise direction. The piston 64 does not reciprocate in the manner of the piston of a conventional internal combustion engine; that is to say, it does not stop momentarily to reverse direction; but rather this rotary engine piston moves with the rotor at all times and merely speeds up and slows down relative to said rotor. Piston 64 has an extra long stroke and provides a positive intake, compression, power and exhaust action which produces power without many of the undesirable side effects such as pollution. The engine is so designed and arranged that there is no need for many of the usual components such as oil pumps and the like whereupon optimum use can be made of the horsepower developed. Very little space is required for the engine and a number of the engines can be arranged side by side to drive one machine if so desired.

The engine 10 has been described as having the bevel gear 85 mounted on the end wall 17 to mesh with the small pinion 83 which meshes with the large pinion 82. It should be noted that gear 85 and pinion 83 are not absolutely essential to the operation of the present engine since the gear 84 transmits drive directly to the pinion 82. However, the double bevel gear arrangement is preferred since it provides a balanced distribution of the driving force on the pinion 82 and a smoother running engine.

I claim:

1. A rotary engine comprising a housing having an annular side wall, a drive shaft journalled in the housing, a rotor non-rotatably mounted on the drive shaft within the housing, said rotor having a rim adjacent the side wall, a cylinder on the rotor alongside the rim and curved about the axis of rotation of the drive shaft, a piston mounted for reciprocation within the cylinder and having a connecting rod, a rocking beam journalled to rock about the axis of rotation of the drive shaft and having one end connected to the connecting rod, a pinion rotatably mounted on the opposite end of the rocking beam, a gear carried by the housing in mesh with the pinion, a cam gear rotatable with the pinion, an oscillator gear mounted on the rim in mesh with the cam gear, and said rim having an intake port through which fuel is induced into the cylinder.

2. A rotary engine as claimed in claim 1, in which fuel is supplied to the cylinder by means including a supply port on the annular side wall which is swept by the intake port as the rotor rotates within the housing.

3. A rotary engine as claimed in claim 2, and including means mounted on the annular side wall for igniting the fuel through the intake port.

4. A rotary engine as claimed in claim 3, and including exhaust means comprising an elongated exhaust port formed on the annular side wall in the path of the intake port.

5. A rotary engine as claimed in claim 4, in which said annular side wall has a compression release groove connected to the exhaust port and extending away from said exhaust port in the direction of travel of the rotor.

6. A rotary engine as claimed in claim 1, in which said rim has transversely spaced oil rings in sliding contact with an inner surface of the annular side wall of the housing.

7. A rotary engine comprising a housing, a drive shaft, a rotor non-rotatably mounted on the drive shaft within the housing, a cylinder on the rotor curved about the axis of rotation of the drive shaft, a piston mounted for reciprocation within the cylinder and having a connecting rod, a rocking beam journalled to rock about the axis of rotation of the drive shaft and having one end connected to the connecting rod, and gear means operatively connecting an opposite end of the rocking beam to the housing and the rotor whereby rotation of the rotor causes the piston to reciprocate in the cylinder, said gear means including a bevel pinion carried by the rocking beam, a bevel gear fixedly mounted in the housing in mesh with the bevel pinion, an oscillator gear mounted on the rotor, and a cam gear rotatable with the bevel pinion in mesh with the oscillator gear.

* * * * *